Patented Mar. 12, 1929.

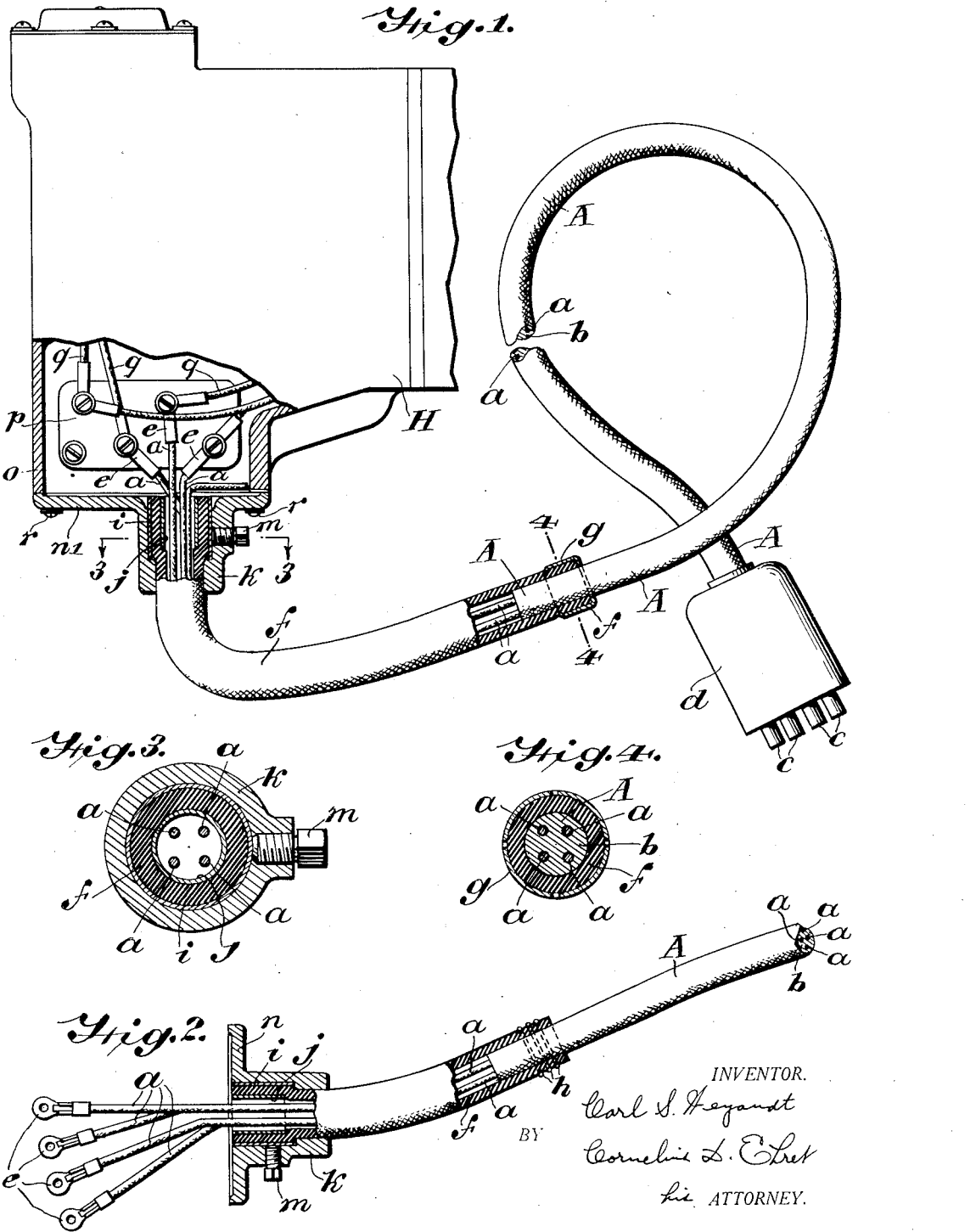

1,704,849

UNITED STATES PATENT OFFICE.

CARL S. WEYANDT, OF PITTSBURGH, PENNSYLVANIA, ASSIGNOR TO CENTRAL ELECTRIC TOOL COMPANY, OF PITTSBURGH, PENNSYLVANIA, A CORPORATION OF PENNSYLVANIA.

PORTABLE TOOL AND CONDUCTOR.

Application filed December 26, 1925. Serial No. 77,761.

My invention relates to means for protecting a cable comprising a plurality of conductors connecting with or for supplying electrical energy to a portable electrical device, as an electric hammer or other tool.

In accordance with my invention, a section of the insulating material surrounding the ends of a plurality of individually insulated conductors comprised in a cable is stripped, or otherwise suitably removed, from around the individually insulated conductors and a suitable structure, as a flexible tube or a section of air hose, is substituted for the material removed to surround and protect the insulated conductors which are free to move with respect to each other within the protecting structure.

Further in accordance with my invention one end of a protective structure as aforesaid, surrounding a plurality of insulated conductors while permitting relative transverse movement thereof, is mechanically connected to a portable device or tool and the other end of said structure is suitably attached to the cable proper.

My invention resides in apparatus of the character hereinafter described and claimed.

For an illustration of some of the various forms of my invention may take, reference is to be had to the accompanying drawing in which:

Figure 1 is a side elevational view partly in section, of an electrical tool having a cable constructed in accordance with my invention connected thereto.

Figure 2 is an elevational view partly in section of a modified form of cable.

Figure 3 is an enlarged sectional view taken on the line 3—3 of Figure 1 looking in the direction of the arrows.

Figure 4 is a sectional view taken on the line 4—4, Figure 1.

Referring to the drawings, there is illustrated a cable or lead A comprising any suitable number of individually insulated or rubber-covered conductors a. In the example illustrated, four of such insulated conductors are embedded in and surrounded by suitable insulation b. The individual conductors comprised in the cable A may be associated with a suitable source of electrical energy, not shown, for example by individually connecting adjacent free ends of such conductors to contacts c comprised in a plug d, or similar device. Structure of this character is well-known in the art and is here illustrated to indicate one application of my invention.

In accordance with my invention, the ends of the individual insulated conductors a comprised in cable A are exposed and freed from the restraining influence of insulation b by removing a section thereof whose length may be variable, as twelve inches, more or less. After removal of a portion of the insulation from the end of each conductor a, a terminal e is soldered, or otherwise suitably secured thereto. Around the free ends of insulated conductors a protruding beyond the insulation b remaining in the cable A, there is applied a suitable protecting device or structure, as a section of air hose f which may be readily slipped over terminals e and the now free conductors a and the end thereof moved into engagement with and over the end of insulation b to which it may be suitably secured, as by the ferrule g, Fig. 1, or the wire-clamp h, Fig. 2.

Any suitable structure may be utilized for mechanically coupling or connecting a cable and protecting structure of the character aforesaid to an electrical device, such as a tool of any desired character whose operating mechanism is supplied by current through the conductors a. To this end, I may utilize a construction of the character illustrated in Fig. 2, wherein the free end of protecting device f is provided exteriorly and interiorly with metallic sleeves i and j, a coupling member k fitting over the exterior sleeve i and a portion of the protecting device f. A set screw m, or equivalent, passing through a threaded aperture in coupling k co-acts with the exterior sleeve i to hold said coupling in fixed relation with respect to the protective device f and cable A. A flange n formed preferably integrally with coupling k may be secured to the tool or other device in any desired manner.

A cable of the character described above is especially useful in combination with a portable electric tool, as an electric hammer, indicated generally at H in Fig. 1. When thus utilized, the conductors a after passing through the protective device f lead interiorly of the casing o of hammer H and the terminals e are secured to a panel p, or equivalent, from whence lead conductors q to the various operating parts and control switch of the hammer.

Cable A including the protective device $f$ may be mechanically connected to casing $o$ by structure including the sleeves $i$ and $j$ and coupling $k$ of the same general character indicated in Fig. 2. However, it is desirable when the cable is connected with a device as indicated in Fig. 1 that a modified flange $n^1$ of coupling $k$ be substituted for the flange $n$, Fig. 2, whereby said flange $n^1$ may be secured to casing $o$, as by the screws $r$, to thereby constitute a closure plate for said casing $o$.

Obviously, under conditions met in ordinary usage, the cable carrying the current-supplying conductors of a portable electric tool or the like is subjected to repeated bending in the region wherein connection is effected with the tool. As a result, it often happens that individual conductors fracture interiorly of the surrounding insulating casing and this is probably due to the fact that one or more conductors must bend to a greater extent than the others. With my construction, however, when the cable bends, there is sufficient clearance within the protective device or air hose $f$ to permit adjustment of the individual conductors to their new curvature without undue stretching. Furthermore, by properly selecting their length, a slight amount of slack may be given to the individual conductors to forestall any stretching thereof that might occur should the cable be sharply bent.

What I claim is:

1. A cable terminating in a plurality of insulated conductors and a flexible elongated tube-like protecting structure attached to said cable and surrounding said insulated conductors but permitting movement thereof relative to each other when said protecting structure is flexed.

2. A cable terminating in a plurality of insulated conductors and a flexible elongated protecting structure attached to the exterior insulating medium comprised in said cable, said protecting structure surrounding said insulated conductors but permitting substantial movement thereof relative to each other when said protecting structure is flexed.

3. A cable comprising a plurality of contiguous insulated conductors, an insulating medium surrounding said insulated conductors and in which they are embedded, said medium extending to a region spaced from one end of said insulated conductors, and protective means attached to said medium and surrounding said insulated conductors but permitting transverse movement thereof relative to each other and extending toward said end of said insulated conductors.

4. A cable comprising a plurality of contiguous insulated conductors, an insulating medium surrounding said insulated conductors and in which they are embedded, said medium extending to a region spaced from one end of said insulated conductors, a flexible protective structure surrounding said insulated conductors while permitting transverse movement thereof relative to each other and extending from said region toward the end of said insulated conductors, and means for uniting said medium and protective structure.

5. A cable comprising a plurality of contiguous insulated conductors, an insulating medium surrounding said insulated conductors and in which they are embedded, said medium extending to a region spaced from one end of said insulated conductors, a flexible protective structure overlying the end of said medium and surrounding said insulated conductors while permitting transverse movement thereof relative to each other and extending from said region toward the end of said insulated conductors, and a ferrule coacting with the overlying end of said protective structure and the end of said medium.

6. A cable comprising a plurality of contiguous insulated conductors, an insulating medium surrounding said insulated conductors and in which they are embedded, said medium extending to a region spaced from one end of said insulated conductors, a flexible protective structure surrounding said insulated conductors while permitting transverse movement thereof relative to each other and extending from said region toward the end of said insulated conductors, and a coupling carried by the end of said protective structure removed from said region.

7. A cable comprising a plurality of contiguous insulated conductors, an insulating medium surrounding said insulated conductors and in which they are embedded, said medium extending to a region spaced from one end of said insulated conductors, a flexible protective structure surrounding said insulated conductors while permitting transverse movement thereof relative to each other and extending from said region toward the end of said insulated conductors, and a flanged coupling carried by the end of said protective structure removed from said region.

8. A cable comprising a plurality of contiguous insulated conductors, an insulating medium surrounding said insulating conductors and in which they are embedded, said medium extending to a region spaced from one end of said insulated conductors, a flexible protective structure surrounding said insulated conductors while permitting transverse movement thereof relative to each other and extending from said region toward the end of said insulated conductors, a sleeve carried by the end of said protective structure removed from said region, and a coupling attached to said sleeve.

9. The combination with a portable electric tool, of a cable comprising a plurality of adjoining insulated conductors electrically connected with elements of said tool, and means comprising a flexible protective structure surrounding the ends of said insulated conductors adjacent said tool but permitting movement thereof relative to each other for mechanically connecting said cable and tool.

10. The combination with a portable electric tool, of a cable comprising a plurality of adjoining insulated conductors electrically connected with elements of said tool, a flexible protective structure attached to said cable in a region removed from said tool, said protective structure enclosing the portions of said insulated conductors between said region and tool but permitting transverse movement thereof relative to each other, and a coupling through which said insulated conductors pass attached to said tool and protective structure.

11. The combination with a portable electric tool, comprising a housing and a panel mounted therein, of a cable comprising a plurality of adjoining insulated conductors electrically connected with said panel, a flexible protective structure attached to said cable in a region removed from said tool, said protective structure enclosing the portions of said insulated conductors between said region and tool but permitting transverse movement thereof relative to each other, and a coupling through which said insulated conductors pass attached to said tool and protective structure and forming a closure plate for said housing.

12. The combination with a portable electric tool, of a cable comprising a plurality of adjoining insulated conductors adapted to be electrically connected with said tool, and a flexible conduit adapted to be connected through a suitable union to said tool, the said conductors being loosely enclosed by said conduit, and freely movable in a transverse direction with respect to each other.

13. In a flexible cable for a portable electric tool, a plurality of separate insulating conductors adapted to be electrically connected with said tool, and a flexible conduit adapted to be connected through a suitable union to said tool and loosely enclosing said conductors, thereby permitting independent lateral and longitudinal movements of said conductors when said conduit is flexed.

CARL S. WEYANDT.